June 22, 1954

W. B. BROWN 2,681,573

HIGH-TEMPERATURE THERMOMETER

Filed July 18, 1952

Inventor
WILLIAM BYRON BROWN

By
R. J. Schmitt
Walter S. Pawl
Attorneys

Patented June 22, 1954

2,681,573

UNITED STATES PATENT OFFICE 2,681,573

HIGH-TEMPERATURE THERMOMETER

William Byron Brown, Lakewood, Ohio

Application July 18, 1952, Serial No. 299,778

7 Claims. (Cl. 73—341)

(Granted under Title 35, U. S. Code (1952), sec. 266)

The invention described herein may be manufactured and used by or for the Government of the United States of America for governmental purposes without the payment of any royalties thereon or therefor.

This invention relates to high temperature measurements and more particularly to thermometers insertible directly in a high temperature gas stream.

For high temperature determination, particularly in the case of gases, use heretofore has been made of optical and radiation pyrometers as well as pyrometers using thermocouples inserted directly in the gas stream. Each of these instruments is subject to serious difficulties. In the case of the optical and radiation pyrometers errors readily develop due to variation in light and radiation intensities brought about by the thickness of the gas stream wall layer, by wall heat emissivity, by wall temperature and by chance flame formations. With thermocouple pyrometers, limitation is enforced by the melting temperatures of the component thermocouple metals.

An outstanding and primary object of the invention, is to provide a thermocouple which can be inserted in and be actuated directly by a highly heated gas stream without melting of the thermocouple metals. Another important object is to provide thermocouple pyrometer apparatus of the direct immersion type which may extend the usual temperature determination range from two to three times or more.

Other objects and many of the attendant advantages of this invention will be readily appreciated as the same becomes better understood by reference to the following detailed description, when considered in connection with the accompanying drawings wherein.

Figure 6:
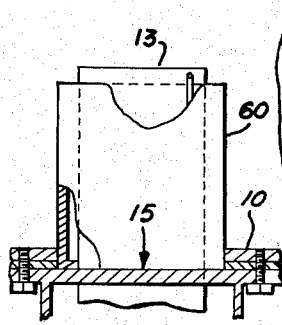
Fig. 6 is a detail showing a radiation shield applied to the device inside the gas tube.
Figure 1:
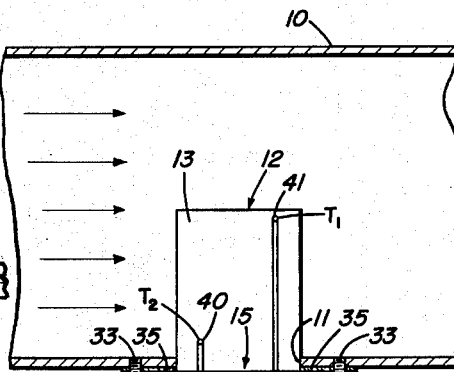
Fig. 1 is a sectional view of the pyrometer showing its application to a heated gas tube.

Numeral 10 in the various figures of the drawing indicates a tube for transfer of highly heated gases, such as may flow in a gas turbine. A longitudinal slot 11 is formed in the wall of the tube into which a metal plate is inserted, so that there is an inner plate section 13 having a substantial entry into the tube space and an outer plate section 14 protruding outside the tube for inclusion in the pyrometer supporting and cooling apparatus.

Figure 2:
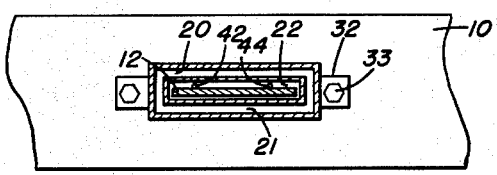
Fig. 2 is a sectional view of the pyrometer taken on lines 2—2 of Fig. 1.

Outside the tube is a U-shaped duct 15 including side arms 16 and 17 and cross arm 18 joining an end of each side arm. The duct side arms are intended for application on opposite edges of the external section 14 of plate 12 and the cross arm for application to the plate sides at the areas adjacent the tube slot 11. For this application the cross arm 18 is broadened and divided into two parallel ducts 20 and 21, separated by a longitudinal rectangular opening 22 of sufficient width to include the plate 12 and the thermocouple leads as shown in Fig. 2. In order to enclose the outer plate section 14 and thereby assist in the cooling action of the duct side arms 16 and 17, side plates 23 and 24, which may be integral with the side arms 16 and 17, are provided. Also, in order to provide a cooling fluid flow through duct 15 the duct ends are closed and inlet and outlet tubes, 25 and 26, respectively, inserted adjacent the duct ends. A branched T-coupling 27 is secured to the inlet tube with pipe connections 28 and 29, pipe 28 leading to a hot fluid source, as hot water, through a valve 30, and pipe 29 leading to a cold fluid source, as cold water, through a valve 31. The entire duct cooling tube structure is secured to the tube 10 by attachment of off-set tabs 32 in extension of duct cross arm 18, to the wall of tube 10 by means of screws 33. Suitable gas sealing gaskets 35 are interposed between the tabs and the tube 10.

Figure 5:
Fig. 5 is a detail showing the pyrometer plate section 13 coated with refraction corrosion resistant material.
Figure 3:
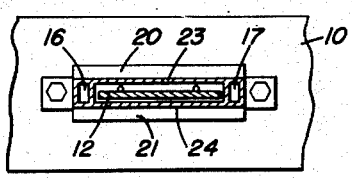
Fig. 3 is a sectional view taken on lines 3—3 of Fig. 1.

Thermocouples 40 and 41 are employed to give the temperatures $T_1$, $T_2$, inside tube 10 at displaced points on plate section 13. Thermocouple 40 is placed adjacent the tube wall to register temperature $T_2$ closely approaching the temperature of the fluid in the cross duct 18. Thermocouple 41 registers temperature $T_1$ and is placed adjacent the inner end of plate section 13 so as to be in the full current of the heated gases and be subject to the highest heat of gas flow. From thermocouple 40, leads 42 pass along the plate surface to the outer end thereof where connection is made to a meter 43. Similarly, from thermocouple 41, leads 44 pass out of the tube 10 on the plate face and are connected to meter 45. While leads 42 and 44 are shown as lying on the plane surfaces of plate 12 it may be desirable to groove the plate surface to permit closer fitting of the cooling duct, as shown in Fig. 5.

The operation of the pyrometer is based on the fact that for two displaced points 40 and 41 on a heat conducting base immersed in a heated gas, the temperature difference between these two points, if plotted against the value of one of them, as $T_1$, for a series of different values for $T_2$ controlled by the cooling duct, results in a straight line having the formula $$T_1 - T_2 = n(Tg - T_1)$$

where $Tg$ is the point of intersection of the projected straight line with the $T_1$ abscissa. Thus, it becomes necessary only to determine the slope of the $T_1$—$T_2$ straight line and $Tg$ may at once be determined either graphically or by calculation from the formula.

Figure 4:
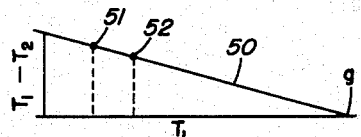
Fig. 4 is a graph illustrating the thermometer action.

The above relationships are illustrated by the curve of Fig. 4. Wherein the ordinate is in $T_1$—$T_2$ values for different $T_2$ temperatures, the abscissa is plotted in $T_1$ scale, and the straight line 50 is drawn through $T_1$—$T_2$ values 51 and 52 to intersect the $T_1$ axis of $g$.

It is important to note that in actual use $T_1$ at the thermocouple point 41 is always at a temperature greatly reduced from the actual gas temperature due to the heat conductivity of metal support plate 12. Consequently, the thermocouple at 41 is able to measure temperatures from two to three or more times the value heretofore possible with thermocouples in direct gas immersion.

It is apparent that the accuracy of the pyrometer may be increased by using liquids having lower freezing and higher boiling points than water. Also, by use of dual instruments a direct reading pyrometer could be constructed. Also, automatic controls could readily be applied. While uncoated metal is illustrated for the plate 15, it may be desirable to coat this plate with refractory substance to reduce corrosion or oxidation as shown by ceramic coating 60 of Fig. 5. Also, in some instances it may be desirable to enclose the plate section 13 with radiation shields according to common procedure, as shown, for example, at 60 in Fig. 6 where a tubular metal shield encloses the bar section 13.

Obviously, many modifications and variations of the present invention are possible in the light of the above teachings. It is, therefore, to be understood that within the scope of the appended claims the invention may be practiced otherwise than as specifically described.

What is claimed is:

1. A pyrometer for heated gas temperature measurement in gas conduits comprising a heat conducting elongated bar, means for supporting said bar radially on said conduit with a bar section extending into said conduit in the path of heated gas flow and ending in said path, a first thermocouple mounted on the section end of said bar section, a second thermocouple mounted on said bar at a point outwardly displaced from said inner bar end, means connected to said thermocouples for indicating the temperature of each thermocouple, and means for cooling said bar at a point displaced from the inner end thereof.

2. The pyrometer, as defined in claim 1, with said cooling means comprising a fluid conducting tube having a tube section in proximity to said bar adjacent said second thermocouple.

3. The pyrometer as defined in claim 2, said fluid conducting tube being provided with plural branches at one end thereof for supply of coolant of different temperatures thereto, and valve means for selecting one of said branches for fluid flow into said fluid conducting tube.

4. A pyrometer for temperature measurement of heated gas inside a chamber comprising a heat conducting bar, support means for attaching said bar to the wall of said chamber with the bar extending inwardly into said chamber from the wall support means and ending in said chamber, a first thermocouple mounted on the bar where it ends in said chamber, a second thermocouple mounted on the bar outwardly from said first thermocouple, means including a heat transfer device in heat conducting relation to said bar for maintaining said second thermocouple at a temperature lower than said first thermocouple and said first thermocouple at a temperature lower than said heated chamber gas, and means for indicating said thermocouple temperatures.

5. The pyrometer as defined in claim 4 with means mounted in proximity to said bar for intercepting heat radiation from points external to said bar.

6. The pyrometer as defined in claim 4 and protective means on said bar for reducing gas corrosive effects on said bar.

7. The pyrometer as defined in claim 6 with said protective means consisting of a ceramic coating.

References Cited in the file of this patent

UNITED STATES PATENTS

| Number | Name | Date |
| --- | --- | --- |
| 2,006,469 | Lucke | July 2, 1935 |
| 2,266,185 | Fillo | Dec. 16, 1941 |

FOREIGN PATENTS

| Number | Country | Date |
| --- | --- | --- |
| 599,946 | Great Britain | Mar. 24, 1948 |